United States Patent [19]
Zittlau

[11] Patent Number: 6,157,887
[45] Date of Patent: Dec. 5, 2000

[54] BRAKE SYSTEM FOR A MOTOR VEHICLE

[75] Inventor: Dirk Zittlau, Stöckelsberg, Germany

[73] Assignee: Siemens Aktiengesellschaft, Munich, Germany

[21] Appl. No.: 09/160,866

[22] Filed: Sep. 25, 1998

[30] Foreign Application Priority Data

Sep. 29, 1997 [DE] Germany ............................ 197 42 988

[51] Int. Cl.[7] .................................................. G06F 19/00
[52] U.S. Cl. ................ 701/70; 303/122.03; 303/122.04; 303/122.05; 369/237
[58] Field of Search .................. 701/70, 76; 303/122.03, 303/121, 122.04, 122.05, 122.08; 369/237

[56] References Cited

U.S. PATENT DOCUMENTS

| | | | |
|---|---|---|---|
| 3,944,288 | 3/1976 | Bertolasai | 188/181 |
| 4,745,542 | 5/1988 | Baba et al. | |
| 5,265,472 | 11/1993 | Pfeifle et al. | 73/514.02 |
| 5,343,396 | 8/1994 | Youngblood | 701/70 |
| 5,372,221 | 12/1994 | Jalbert | 188/1.11 L |
| 5,519,615 | 5/1996 | Schob et al. | 701/70 |
| 5,646,841 | 7/1997 | Suzuki et al. | 701/70 |
| 5,752,748 | 5/1998 | Schramm et al. | 303/20 |
| 5,991,681 | 11/1999 | Bill et al. | 701/70 |
| 6,045,199 | 4/2000 | Toyoda | 303/159 |
| 6,052,642 | 4/2000 | Wagner et al. | 701/70 |

FOREIGN PATENT DOCUMENTS 196 15 186
C1  8/1997  Germany.

*Primary Examiner*—William A. Cuchlinski, Jr.
*Assistant Examiner*—Olga Hernandez
*Attorney, Agent, or Firm*—Herbert L. Lerner; Laurence A. Greenberg; Werner H. Stemer

[57] ABSTRACT

A brake system for a motor vehicle, comprising a pedal unit including a plurality of sensors generating sensor signals upon actuation of a brake pedal of a motor vehicle and further sensors generating additional brake signals. At least one electronic control unit including at least three arithmetic units are programmed to evaluate the sensor signals generated by the plurality of sensors, calculate desired values for a brake actuation force, compare the calculated desired values with each other, determine if at least two calculated desired values agree with each other within a predetermined tolerance, and upon this determination, output a wheel braking demand signal dependent upon the two agreed values. At least two of the arithmetic units are programmed to compare the additional brake signals generated by the further sensors, and if the additional brake signals agree within a predetermined tolerance, to output a corrected wheel braking demand signal. At least one electronically activated brake actuator receiving the wheel braking demand signal and the corrected wheel braking demand signal and in response thereto, applying the brake actuation force to a wheel of a motor vehicle.

7 Claims, 2 Drawing Sheets

BRAKE SYSTEM FOR A MOTOR VEHICLE

BACKGROUND OF THE INVENTION

Field of the Invention

The invention relates to a brake system for a motor vehicle including electronically actuated brake actuators assigned to the wheels of the motor vehicle. A pedal unit includes a plurality of sensors generating sensor signals in response to an actuation of a brake pedal because of a desired driver demanded braking. At least one electronic control unit evaluates the sensor signals and generates desired signals for a brake actuation force to be applied by the brake actuators. At least one transmission channel connects the pedal unit, the brake actuators and the control unit to one another.

Recent demands made of brake systems in motor vehicles—such as anti-lock systems, vehicle stability systems, drive slip or traction control systems, so-called smart cruise controls, brake assistants, and so forth—together with the demand to reduce assembly and maintenance costs, which are quite considerable in the current hydraulic brake systems—have lead to the development of new, purely electrical brake systems (also known as brake by wire), as described for instance in German Patent DE 196 15 186 C1 which defines the generic type pertinent to the present case.

In such an electrical brake system, the driver is disconnected in terms of force from the brake; that is, the braking moment demand expressed by the driver is no longer transmitted directly in the form of force via a hydraulic system but rather only as a signal over an electrical line. With this signal, an electric brake actuator is controlled, which with the aid of an electric energy supply generates a force at a brake which via a friction element generates the desired braking moment. In the case of a disk brake, the force that generates the braking moment via friction is called the brake application force.

The brake actuator (or braking force actuator) is mounted directly on the applicable wheel of the motor vehicle, so that its brake application force is expediently not transmitted over great distances in the vehicle, while the devices for detecting the braking moment demand on the part of the driver and the brake controller are disposed at a central point, for instance in the vicinity of the brake pedal. Thus the brake system is distributed over the entire motor vehicle.

Ascertaining the driver demand for braking moment and the system controller are central elements of major significance for the safety of the brake system. The brake pedal with the sensors is the sole source for detecting the driver's braking wish. The driver's braking demand is calculated on the basis of that wish, in that the sensor values are compared with one another to determine their validity, and that with the aid of predetermined rules and characteristic curves, a desired braking value for controlling the brake actuators is calculated.

ABS control units in hydraulic brake systems meet the need for a central brake controller that is capable of varying the braking demands coming from the driver (ABS, TCS or traction control system functions, etc.). Such a variation must meet stringent safety requirements, since it can directly affect the use of the brakes. ABS control units are therefore as a rule equipped with two microcomputers which monitor one another (U.S. Pat. No. 4,745,542). Since these control units perform solely additional functions of the brake system that are not necessary for the basic braking by the driver, this control unit has a secure state; that is, if a relevant error occurs it can be put into this safe state, namely the "OFF" state. This requires merely that it be known that such an error be present; no information about the type of error is needed.

SUMMARY OF THE INVENTION

The object of the invention is to create an electrical brake system that is especially secure against a failure.

With the foregoing and other objects in view there is provided, in accordance with the invention, a brake system for a motor vehicle, comprising: a pedal unit including a plurality of sensors generating sensor signals upon actuation of a brake pedal of a motor vehicle; further sensors generating additional brake signals; at least one electronic control unit including at least three arithmetic units programmed to: evaluate the sensor signals generated by the plurality of sensors, calculate desired values for a brake actuation force, compare the calculated desired values with each other, determine if at least two calculated desired values agree with each other within a predetermined tolerance, and upon the determination, output a wheel braking demand signal dependent upon the at least two agreed values. At least two of the arithmetic units are programmed to compare the additional brake signals generated by the further sensors, and if the additional brake signals agree within a predetermined tolerance, the arithmetic units are programmed to correct the wheel braking demand signal, and to output the corrected wheel braking demand signal. At least one electronically activated brake actuator receives the wheel braking demand signal and the corrected wheel braking demand signal and in response thereto, applies the brake actuation force to a wheel of a motor vehicle. It should be understood that more than one wheel of a motor vehicle, for example, four wheels could be provided with at least one electronically activated brake actuator to receive the wheel braking demand signal and the corrected wheel braking demand signal.

In accordance with an added feature of the invention, the brake system includes a first data transmission channel connected to at least two of the arithmetic units, and a second data transmission channel connected to at least two of the arithmetic units.

In accordance with an additional feature of the invention, the first data transmission channel is a bi-directional data bus, and the second data transmission channel is a unidirectional line connected to the brake actuator and transmitting a pulse width modulated signal controlling the brake actuator.

In accordance with another feature of the invention, the first data transmission channel transmits the corrected wheel braking demand signal along with an identifier to the brake actuator, and the second data transmission channel transmits the wheel braking demand signal to the brake actuator.

In accordance with a further feature of the invention the arithmetic units are programmed to detect a failure of one of the arithmetic units, and upon the failure of the one of the arithmetic units, properly functioning arithmetic units determine and output the wheel braking demand signal and the corrected wheel braking demand signal.

In accordance with a further added feature of the invention, the plurality of sensors generating sensor signals includes at least three sensors; at least one of the sensors detecting actuation of the brake pedal in accordance with a different measurement principle than at least one other of the sensors.

In accordance with a further additional feature of the invention, at least one of the arithmetic units includes a data interface for exchanging data with control units of a motor vehicle.

A concomitant feature of the invention is in particular that the existing resources of the central controller (for ABS etc.) can be jointly used for this object as well, thus considerably reducing the expense for components for calculating the braking demand of the driver. As a result, not only is an economical version achieved but also one that is safer—because fewer components are required. The stringent safety requirements in ascertaining a driver's wishes do not extend here to the additional functions (ABS etc.), which still, as before, have a safe state ("OFF") and for which a two-channel design therefore suffices.

Other features which are considered as characteristic for the invention are set forth in the appended claims.

Although the invention is illustrated and described herein as embodied in a brake system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE DRAWINGS

Figure 1:
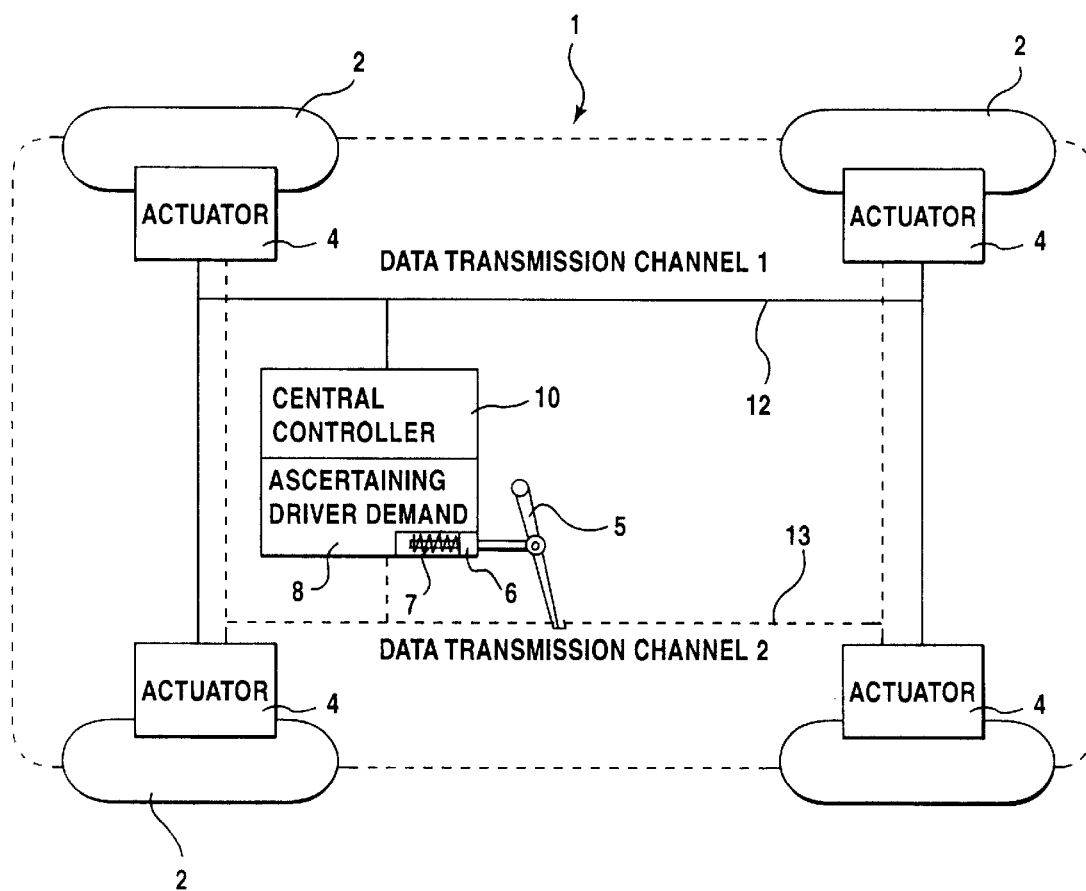
FIG. 1, shows a schematic diagram of a motor vehicle with a brake system according to the invention.

A motor vehicle, which is shown only schematically in FIG. 1, is provided with a brake system 1, which includes one brake (not shown here) on each of its four wheels 2 that is actuated by a respective electrically controlled brake actuator or final control element 4. The brakes are actuated by the driver of the motor vehicle by his delivering a braking moment demand via a brake pedal 5, which is connected to a pedal unit 6. The pedal unit 6 acts as a pedal force simulator; it is provided with a spring 7 and a plurality of sensors, for instance two force sensors and at least one travel sensor (see FIG. 2), which detect the actuation of the brake pedal 5 by the driver and convert it into electrical signals. These sensors are combined in the drawing in a block 8 captioned "ascertaining driver demand".

Block 8 is connected to a central controller 10, which in turn is connected via a first data transmission channel or data bus 12 and a second data transmission channel or data bus 13 with the brake actuators 4.

The brake system 1 assures that the driver's wish will be transmitted to the actuators 4 in every case. A failure of the brake system cannot be permitted, because then braking of the vehicle would no longer be possible. Aside from the failure of the braking action, undesired braking is another dangerous type of error. It, too, must be avoided in every case. A three-channel structure of the brake system offers the greatest safety, since then not only is an error ascertained but the correct value is detected as well. After a relevant error, maximum availability of the brake system is still assured. Furthermore, this availability must be assured for as long as possible; that is, at least emergency braking must still be possible even after a further error. An affected vehicle therefore need not be stopped immediately but instead can be driven for some time until maintenance is performed. For that purpose, errors must be reliably detected, and a substitute channel must be available.

Figure 2:
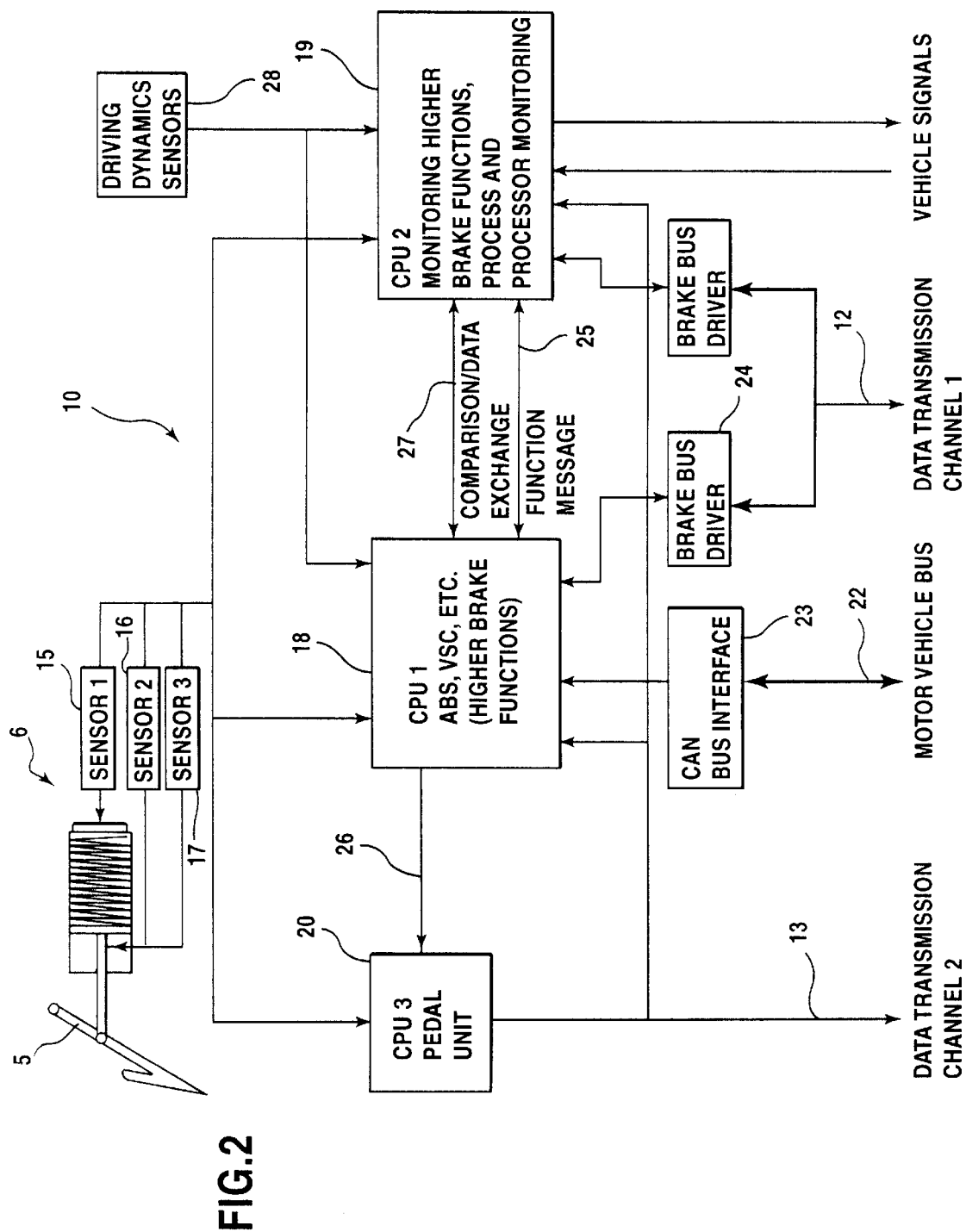
FIG. 2, shows a central controller of the brake system of FIG. 1, together with a pedal unit.

The layout of a central controller 10 can be seen from FIG. 2. The driver's wish, manifested in the depression of the brake pedal 5, is measured at the brake pedal 5 with at least three sensors—for instance, one force sensor 15 and two travel sensors 16, 17—which detect the pedal force and the pedal travel, respectively. The values ascertained by these sensors are transmitted as sensor signals to at least three arithmetic units (or CPUs) 18, 19 and 20. All three arithmetic units 18–20 calculate the braking demand of the driver from the sensor signals by the same rules and the same memorized characteristic curves.

The calculated values are compared with one another in the three arithmetic units. If they are identical to one another within predetermined, close tolerances, then they represent the braking moment demanded by the driver, which for example is equivalent to a brake caliper application force.

The arithmetic unit 18 furthermore, from further sensor signals that it receives via a motor vehicle bus 22 and a bus interface 23, or from directly connected sensors 28, or via the data transmission channel 12, calculates additional electronic braking demands or brake control signals, for example for the following functions: ABS, traction control (TCS), vehicle stability control (VSC), panic braking (PBA), and so forth. The additional brake control signals optionally vary the braking moment demanded by the driver (in ABS, they reduce it) or replace it (in the TCS function, they generate a braking moment independent of the driver's wish). The sensor signals received indicate primarily the wheel speeds and optionally other measured values as well, such as the steering angle, transverse acceleration, yaw speed, etc.

The braking moments generated in the form of control signals in the central controller 10 are transmitted, in the case of normal, unimpeded braking operation, to the brake actuators 4 via a bus driver 24 and the first data transmission channel 12. The unmodified driver's wish is transmitted to the brake actuators 4 via the data transmission channel 13. In the normal case, the first data transmission channel 12 is served by the first arithmetic unit 18 or in other words supplied by it with control signals, but it can also be served by the second arithmetic unit 19. The data arriving on the data transmission channel 12 are read out by the second arithmetic unit 19. The second transmission channel 13 is served by the third arithmetic unit 20, and the contents transmitted to it are read out by the arithmetic units 18 and 19.

Between all three arithmetic units, function messages can be exchanged over data lines 25 and 26; these messages make it possible for an arithmetic unit detected as defective to be shutoff by the other two arithmetic units. Via a further data line 27, data are exchanged between the arithmetic units 18 and 19; these data make it possible for the electronic braking moment demands calculated in the first arithmetic unit 18 as well as the state of the arithmetic unit 18 to be monitored by the second arithmetic unit 19.

The central controller 10 is thus in a position to carry out a triply redundant determination of the braking demands of the driver, a doubly redundant calculation of the electronic additional braking demands, and a transmission over two data transmission channels that are completely independent of one another. Via the data transmission channel 12, a secure bidirectional transmission takes place, which is embodied for instance as a CAN data bus with a secure protocol. Via the data transmission channel 13, at least one unidirectional data transmission that is secure against interference takes place, for instance in the form of PWM (pulse width modulated) signals.

Ascertaining the electronically determined additional braking moments, conversely, need not always be assured; the functions can be brought into a secure state if an error arises. In the secure state, these functions are off. Accordingly merely the occurrence of an error needs to be reliably ascertained in order to shift to the safe state as a reaction to this. To that end, a two-channel design of the brake system 1, and in particular of the central controller 10, is sufficient. The sensors are combined and represented by reference numeral 28 detect measurement variables relating to the driving dynamics of the motor vehicle, such as the wheel speeds, vehicle speed, yaw speed, etc.

The mode of operation of the central controller 10 will now be described in terms of a function sequence in the event of malfunctions (with error detection and reaction). Since a complete look at all conceivable errors would be too extensive, here only total errors of subunits will be described that occur as an outcome of individual errors.

The arithmetic unit 18 (hereinafter called CPU 1; see also FIG. 2) fails: The CPU 2 (arithmetic unit 19) detects the failure with the aid of process monitoring; the electronic or additional brake functions are turned off, and the CPU 2 takes on the transmission of the driver's wishes over the data transmission channel 12.

The CPU 1 generates a defective electronic braking demand: The CPU 2 detects the difference on the basis of its own calculations; the additional brake functions are turned off, and only the driver's wish is transmitted over the data transmission channel 12 (an erroneous calculation in the CPU 2 has the same effect).

The CPU 2 fails: The CPU 1 detects the failure from the lack of data exchange; the additional brake functions are turned off.

The CPU 2 calculates the additional brake functions erroneously: The CPU 1 detects the difference on the basis of its own calculations; the additional brake functions are turned off, and only the driver's wish is transmitted over the data transmission channel 13 (an erroneous calculation in the CPU 1 has the same effect).

The CPU 1 calculates an incorrect driver braking demand from the incoming sensor signals; this is detected from a comparison with the outcome of the CPU 2 (by data exchange) and of the CPU 3 (at the input to the data transmission channel 13): The CPU 1 is turned off (by functional monitoring by the CPU 2) and the additional brake functions are stopped; the CPU 2 transmits the driver's wish via the data transmission channel 12.

The CPU 2 calculates an incorrect driver braking demand from the incoming sensor signals; this is detected from a comparison with the outcome of the CPU 1 (by data exchange) and of the CPU 3 (at the input to the data transmission channel 13): The CPU 2 is turned off (by functional monitoring by the CPU 1) and the additional brake functions are stopped; the CPU 1 transmits the driver's wish via the data transmission channel 12.

It becomes clear from this that by means of the brake system, all the possible errors can be detected and appropriate reactions can be initiated to prevent a dangerous error in the brake system (failure, undesired braking). The brake system of the invention, with regard to ascertaining the driver's wishes, meets the object of a redundant design with a two-out-of-three characteristic in accordance with DIN Standard V VDE 0801 (Chapter B.1.3.2, p. 73), and with regard to ascertaining electronic braking demands it meets the object of a two-channel design with a safe state ("OFF").

In order to clearly determine how high the availability of such a brake system is after a first error occurs, that is, how long a brake system can continue to be operated at acceptable risk, the threat from a second error must be taken into account. Such an error must not lead to a considerable undesired braking demand, nor to a state in which emergency braking is no longer possible. To that end, only the detection and further carrying of the driver's wishes to the data transmission channels and the actuators need to be looked at. Because a two-channel structure remains after an error, the occurrence of a further error is simple to detect. The problem resides in identifying the value without a malfunction. This requires error detection steps, which can be taken for instance in accordance with the specifications of DIN V VDE 0801 (Chapter B.1.1.2, p. 68; Chapter B.2.1.1.3, pp. 79–80). After an error occurs, a switchover is made from a two out of three decision process to a one out of three decision process.

If a further CPU fails or has an error, then monitoring calculations and comparisons of the results of the remaining arithmetic units provide an indication of which CPU is calculating erroneous values (ascertaining the driver's wishes involves comparatively simple calculations). In cases that do not allow a decision to be made, emergency braking can be initiated either via an additional control input by the driver (for instance, by actuating a hand brake), or automatically. However, in the structure described, such a case is so unlikely as to allow operation to continue for a limited period of time.

This means that the further performance of the brake controller depends on the type of the first error. In some errors, further availability can be assured only with difficulty. The goal of keeping these cases as few and unlikely as possible is achieved in an economical way by the brake system of the invention. In addition, the small number of components required limits the likelihood of error.

I claim:

1. A brake system for a motor vehicle, comprising:
  a pedal unit including a plurality of sensors generating sensor signals upon actuation of a brake pedal of a motor vehicle;
  further sensors generating additional brake signals;
  at least one electronic control unit including at least three arithmetic units programmed to:
    evaluate said sensor signals generated by said plurality of sensors, calculate desired values for a brake actuation force, compare said calculated desired values with each other, determine if at least two calculated desired values agree with each other within a predetermined tolerance, and upon said determination, output a wheel braking demand signal dependent upon said at least two agreed values;
  at least two of said arithmetic units programmed to compare said additional brake signals generated by said further sensors, and if said additional brake signals agree within a predetermined tolerance, to correct said wheel braking demand signal, and to output said corrected wheel braking demand signal; and
  at least one electronically activated brake actuator receiving said wheel braking demand signal and said corrected wheel braking demand signal and in response thereto, applying said brake actuation force to a wheel of a motor vehicle.

2. The brake system according to claim 1, including a first data transmission channel connected to at least two of said arithmetic units; and a second data transmission channel connected to at least two of said arithmetic units.

3. The brake system according to claim 2, wherein:

said first data transmission channel is a bi-directional data bus; and said second data transmission channel is a unidirectional line connected to said brake actuator and transmitting a pulse width modulated signal controlling said brake actuator.

4. The brake system according to claim 3, wherein:

said first data transmission channel transmits said corrected wheel braking demand signal along with an identifier to said brake actuator; and said second data transmission channel transmits said wheel braking demand signal to said brake actuator.

5. The brake system according to claim 1, wherein: said arithmetic units are programmed to:

detect a failure of one of said arithmetic units, and upon said failure of said one of said arithmetic units, properly functioning arithmetic units output said wheel braking demand signal and said corrected wheel braking demand signal.

6. The brake system according to claim 1, wherein said plurality of sensors generating sensor signals includes at least three sensors; at least one of said sensors detecting actuation of said brake pedal in accordance with a different measurement principle than at least one other of said sensors.

7. The brake system according to claim 1, wherein at least one of said arithmetic units includes a data interface for exchanging data with control units of a motor vehicle.

* * * * *